Oct. 8, 1957 S. E. A. PINNELL 2,809,370

MICROWAVE SCANNER

Filed March 18, 1954 2 Sheets-Sheet 1

INVENTOR.
STANLEY E. A. PINNELL

BY J. L. Whittaker
ATTORNEY

MICROWAVE SCANNER

Filed March 18, 1954 2 Sheets-Sheet 2

INVENTOR.
STANLEY E.A. PINNELL
BY J. C. Whittaker
ATTORNEY 2,809,370

MICROWAVE SCANNER

Stanley E. A. Pinnell, Montreal, Quebec, Canada, assignor to RCA Victor Company Limited, a corporation of Canada Application March 18, 1954, Serial No. 417,183

18 Claims. (Cl. 343—762)

This invention relates to scanning systems and particularly to microwave scanning systems providing selectively different scanning functions.

It is often desirable for a single scanning system to provide both continuous scanning and sector scanning. For example, it may be desirable for a single radar (radio echo detection and ranging) scanning system to provide either wide-angle or search scanning and narrow-angle or sector scanning. It also may be desirable for a single scanning system to be capable of providing high-speed sector scanning at one time and at some other time provide slow-speed search scanning. Additionally, it may be advantageous for a single radar scanning system to provide high-speed sector scanning with the sector slowly shifting through a larger search angle. Previously these and other scanning actions have not been available with a single microwave scanner at the election of an operator and with a comparatively simple device.

It is an object of this invention to provide an improved microwave scanning system useful for continuous scan or for sector scan, or for combinations thereof.

It is a further object of this invention to provide a variable-angle microwave scanning system having variable rates of scanning for each available scanning angle.

It is a further object of this invention to provide an improved microwave scanning system, such as a radar scanning system, useful for both wide-angle or search scanning and narrow-angle or sector scanning.

It is a further object of this invention to provide a microwave scanning system, such as a radar scanning system, having provision for high-speed sector scanning with the sector shifting at a controlled rate through a larger search angle.

It is a still further object of this invention to provide a versatile microwave scanning system having provision for selectively scanning all or part of a total scanning angle at a controlled scanning rate.

It is a still further object of this invention to provide a versatile microwave scanning system having a variety of modes of operation at the election of an operator, including the following: (1) radiating or receiving a directional beam in a selected direction, (2) narrow-angle or sector scanning, (3) wide-angle or search scanning, (4) high-speed sector scanning with the sector slowly shifting through a larger search angle, (5) scanning a plurality of sectors with each sector shifting through a larger search angle, and (6) successively radiating or receiving electromagnetic energy in each of a plurality of directions.

According to the invention, a microwave scanning system has a plurality of antenna elements, such as horn antennas, angularly spaced with respect to each other on a rotatable scanning member. A waveguide is independently rotatable with respect to the scanning member. Energy switching means is connected between the rotatable waveguide and the antenna elements. When either the scanning member or the rotatable waveguide is rotated with respect to the other, the energy switching means selectively and successively propagates electromagnetic energy between the rotatable waveguide and each antenna element on the scanning member. When only the scanning member is rotated, narrow-angle or sector scanning is provided. When the rotatable waveguide and the scanning member are rotated together, wide-angle or search scanning is provided. When the rotatable waveguide is rotated more slowly than the scanning member, high-speed sector scanning may be provided and the sector may shift slowly through a larger search angle. When the rotatable waveguide is rotated faster than the scanning member, scanning of several sectors may be provided with each sector shifting through a larger search angle. When only the rotatable waveguide is rotated, electromagnetic energy is radiated or received in each of several fixed directions in turn. When neither the rotatable waveguide nor the scanning member is rotated, electromagnetic energy is radiated or received in one fixed direction.

The foregoing and other objects, advantages and novel features of the invention will be more fully apparent from the following description when read in connection with the accompanying drawing in which similar reference numerals refer to similar parts and in which.

Figure 1:
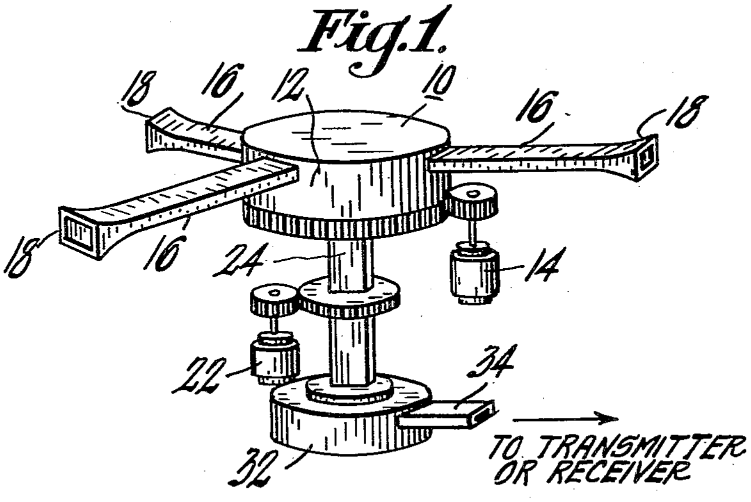
Figure 1 is a perspective view of one embodiment of the invention.

Referring to Figure 1, a rotary switch 10 includes a rotatable scanning member 12, which may be rotated by a motor 14. Each of a plurality of waveguides 16 is coupled at one end to the scanning member 12. The waveguides 16 are spaced around the scanning member 12 in angular relation to each other and each waveguide 16 extends radially outwardly and is coupled at its other end to a horn antenna 18. A rotatable waveguide 24 is coupled coaxially at one end to the rotary switch 10 and at its other end to a rotating joint 32. The rotatable waveguide 24 is independently rotatable with respect to the scanning member 12 by a motor 22. If desired, one of the motors 14 and 22 may be omitted and a variable speed gearing interposed between the remaining motor and the gearing on each of the rotatable members 12 and 24. The rotating joint 32 has a stationary waveguide 34 extending radially outward therefrom. The stationary waveguide 34 has its one end remote from the rotating joint 32 adapted to be connected to a microwave transmitter or receiver.

For convenience, the operation of the invention under transmitting conditions will be explained with the understanding that the path of electromagnetic energy is in the reverse direction under receiving conditions. Electromagnetic energy entering the rotating joint 32 through the stationary waveguide 34 is transferred to the rotatable waveguide 24 as shown, for example, in Breetz Patent 2,595,186. The electromagnetic energy is then propagated along the rotatable waveguide 24 to the rotary switch 10. The rotary switch 10 contains energy switching means, which will be described in detail hereinafter, and provides an energy path between the rotatable waveguide 24 and a selected one of the waveguides 16 extending radially outwardly from the scanning member 12. Electromagnetic energy reaching one of the waveguides 16 is propagated along that waveguide 16 and radiated into space by the respective horn antenna 18 attached to that waveguide 16.

The particular horn antenna 18 energized depends on the relative angular position of the scanning member 12 and the rotatable waveguide 24. Any change in the angular position of the scanning member 12 changes the direction of the beam. If the change is large enough in one direction, the energy is switched to the next succeeding waveguide 16 and horn antenna 18. The angular change required for switching energy to the next succeeding waveguide 16 is determined by the number and spacing of the waveguides 16. A change in the angular position of the rotatable waveguide 24 does not change the direction of the beam unless the change in the position of the rotatable waveguide 24 is sufficient to switch energy to another waveguide 16.

The embodiment of Figure 1 provides several modes of operation at the option of an operator, including the following:

(1) *Waveguide and scanning member fixed*

When neither the rotatable waveguide 24 nor the scanning member 12 is rotated, electromagnetic energy is radiated by one of the horn antennas 18 as a directional beam in a fixed direction.

(2) *Scanning member rotated and waveguide fixed*

When the scanning member 12 is rotated and the rotatable waveguide 24 is not rotated, electromagnetic energy is switched to each waveguide 16 in turn and each horn antenna 18 is energized during a fractional part of each cycle of rotation. For example, where three waveguides 16 are successively spaced at equal angles around the scanning member 12, each horn antenna 18 is energized during ⅓ of each cycle of rotation, less the time lost in switching. Furthermore, in the example given, the horn antennas 18 are successively energized as they scan the same sector of the total scanning angle. In this way the invention provides narrow-angle or sector scanning at a repetition rate which may be substantially greater than that provided by a single antenna rotated at the same rate of rotation.

(3) *Waveguide and scanning member rotated at same rate*

When the rotatable waveguide 24 and the scanning member 12 are both rotated at the same rate and in the same direction, electromagnetic energy is not switched from one waveguide 16 to another. Instead, one horn antenna 18 is energized during the entire cycle of rotation. In this way the invention provides wide-angle or search scanning.

(4) *Waveguide rotated slower than scanning member*

When the rotatable waveguide 24 is rotated in the same direction as the scanning member 12 but at a different rate, electromagnetic energy is switched to each of the horn antennas 18 in succession at a rate determined by the relative rate of rotation of the rotatable waveguide 24 and the scanning member 12. When the rotatable waveguide 24 is rotated at a slower rate than the scanning member 12, the result is sector scanning with the sector shifting through the total scanning angle.

(5) *Waveguide rotated faster than scanning member*

When the rotatable waveguide 24 is rotated at a faster rate than the scanning member 12, electromagnetic energy is switched to each of the waveguides 16 in succession. For different relative rates of rotation the scanning action is different. For example, the rotatable waveguide 24 may be rotated only slightly faster than the scanning member 12. A relative angular position of the scanning member 12 and the rotatable waveguide 24 may be selected so that electromagnetic energy is not switched from a particular horn antenna 18 to another horn antenna 18 during the first complete rotation of the scanning member 12. During the first rotation of the scanning member 12, therefore, the scanning action may be continuous throughout a 360 degree search angle. The relative rate of rotation of the scanning member 12 and the rotatable waveguide 24 may be selected to cause the electromagnetic energy to be switched to another horn antenna 18 during the second rotation, for example, of the scanning member 12. During the second rotation of the scanning member 12, therefore, the scanning action will not be continuous, but rather will be interrupted during a selected part of the rotation of the scanning member 12. During succeeding rotations of the scanning member 12 the scanning action is again interrupted when electromagnetic energy is switched from one horn antenna 18 to another. The relative rate of rotation of the scanning member 12 and the rotatable waveguide 24 may be selected to provide sector scanning during each rotation of the scanning member 12. Several sectors may be scanned during one rotation of the scanning member 12 with the sectors shifting during each succeeding rotation of the scanning member 12.

(6) *Waveguide rotated and scanning member fixed*

If only the rotatable waveguide 24 is rotated, electromagnetic energy will be switched to each of the waveguides 16 in turn. In this event, each of the horn antennas 18 will radiate a directional beam in a fixed direction for a fractional part of each rotation of the rotatable waveguide 24.

Since the rotatable waveguide 24 and the scanning member 12 are independently rotatable, a variety of scanning actions is available. Also, since the rates of rotation of the rotatable scanning member 12 and the rotatable waveguide 24 may be separately controlled, the rate of scanning may be varied for each available scanning angle. If desired, a large number of waveguides 16 and horn antennas 18 may be spaced around the scanning member 12 to provide extremely rapid scanning of a narrow sector, still retaining provision for selecting slower search scanning. Also, variations in spacing the waveguides 16 and horn antennas 18 may be made for certain purposes. The invention provides a microwave scanning system with provision for selecting many types of scanning.

Figures 2, 3:
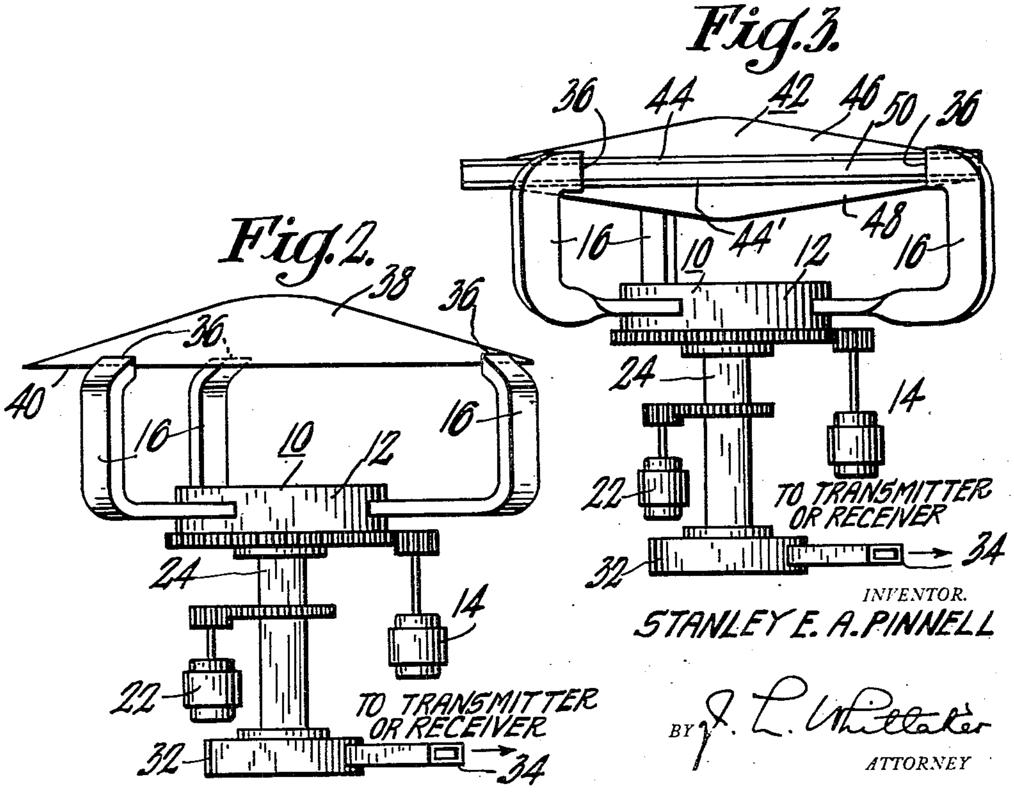
Figure 2 is an elevational view of a modification of the embodiment of Figure 1.
Figure 3 is an elevational view of another modification of the embodiment of Figure 1.

Referring to the modification of Figure 2, each of the waveguides 16 extends radially outwardly from the scanning member 12. However, instead of communicating with horn antennas they are bent backwardly and terminated in open ends 36. A dielectric lens 38 is mounted coaxially with and substantially parallel to the rotary switch 10 and has a circular periphery 40 communicating in spaced relation with the open end 36 of each waveguide 16. The dielectric lens 38 may be shaped to identically focus energy radiating from the open ends 36 of each of the waveguides 16, regardless of the angular position of the scanning member 12. The dielectric lens 38 may be of the type described in Harley Iams Patent No. 2,576,181. Energy radiating from the open end 36 of each waveguide 16 is polarized with the electric vector parallel to the axis of the lens 38 and normal to the plane of the lens circular periphery 40.

Referring to the modification of Figure 3, each of the waveguides 16 extends radially outward from the scanning member 12 and undergoes a 90 degree twist. Then each of the waveguides 16 is bent backwardly and terminated in an open end 36. A focusing device or lens 42 is mounted coaxially with and substantially parallel to the rotary switch 10. The focusing device 42 may be of the type described in William C. Wilkinson Patent No. 2,576,182. The focusing device 42 may comprise a pair of shaped metallic surfaces 46 and 48 separated by a dielectric substance 50. The metallic surfaces 46 and 48 have circular peripheries 44 and 44', respectively, which are spaced apart a distance substantially equal to the width of the H-plane wall of each waveguide 16, so that energy radiating from the open end 36 of each waveguide 16 is propagated between the metallic surfaces 46 and 48. The metallic surfaces 46 and 48 are shaped to focus identically the energy radiating from the open end 36 of each waveguide 16, regardless of the angular position of the scanning member 12. It will be noted that energy entering between the metallic surfaces 46 and 48 is polarized with the electric vector normal to the axis of the focusing device 42 and parallel to the plane of the circular peripheries 44 and 44' of the metallic surfaces 46 and 48.

Figure 4:
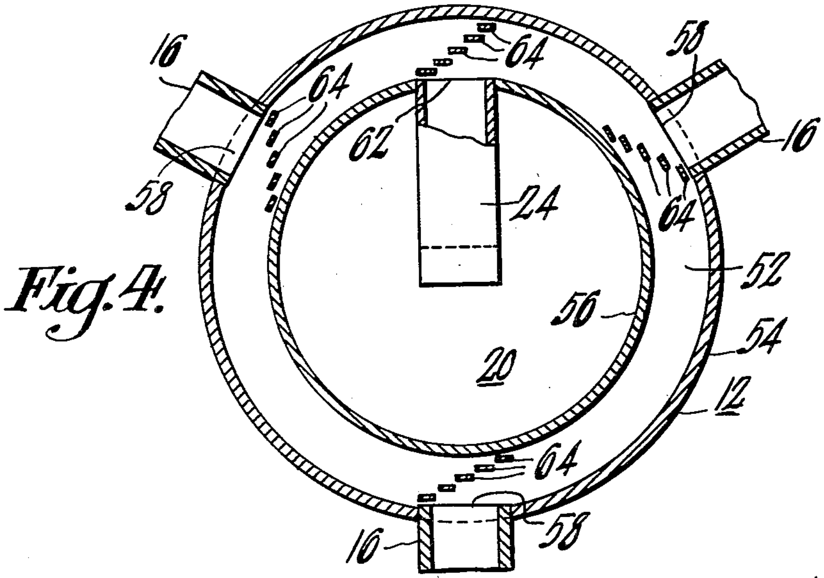
Figure 4 is a transverse cross-sectional view of a rotary switch which may be used with the invention.
Figure 5:
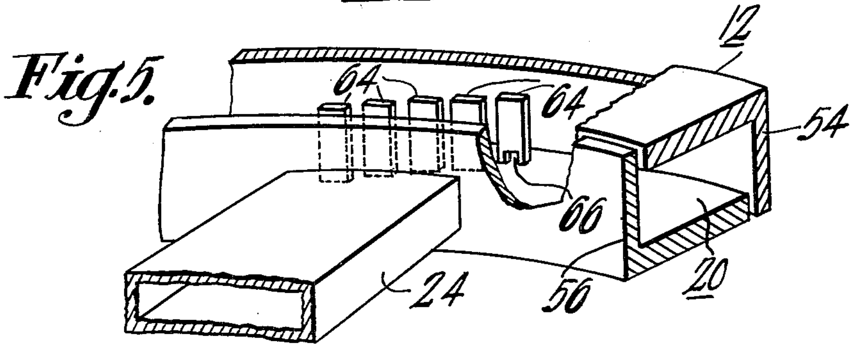
Figure 5 is a partially-cut-away fragmentary perspective view of Figure 4.

In the rotary switch 10 of Figures 4 and 5, an annular waveguide 52 is formed between a rotatable scanning member 12 and a central member 20, which is independently rotatable with respect to the scanning member 12. A curved wall 54 of the scanning member 12 and a curved wall 56 of the central member 20 are opposing E-plane walls of the annular waveguide 52. A plurality of waveguides 16 are spaced around the scanning member 12 in angular relation to each other. Each of the waveguides 16 communicates at one end with the annular waveguide 52 through an aperture 58 in the wall 54 and extends radially outward from the scanning member 12. The central member 20 has at least one waveguide 24 communicating at one end with the annular waveguide 52 through an aperture 62 in the wall 56 and extending radially inward from the wall 62. The waveguide 24 may be bent at an angle intermediate its two ends so that the end remote from wall 62 extends axially into the central member 20.

The annular waveguide 52 has energy switching means disposed between the opposing walls 54 and 56. The energy switching means may include energy directing means near each aperture 58 and 62 to provide a plurality of energy paths between the central member 20 and the scanning member 12. For example, a plurality of spaced teeth 64 may be arranged along arcs extending respectively from a point at or near one edge of each aperture 58 and 62 to a point in the annular waveguide 52 diametrically adjacent to the opposing edge of the same aperture. Each of the teeth 64 near each aperture 58 and 62 may be spaced with relation to adjacent teeth 64 near the same aperture so that the teeth 64 near the aperture 62 will interleave without obstruction with the teeth 64 near each aperture 58 on rotation of the central member 20 with respect to the scanning member 12. The teeth near apertures 58 are connected to the rotatable member 12 while the teeth arranged near the aperture 62 are connected to the central member 20.

The waveguide 24 and the annular waveguide 52 have rectangular cross-sections and the E-plane walls of the waveguide 24 and the E-plane wall 56 of the annular waveguide 52 are joined at right angles. The spaced teeth 64 may comprise thin metallic plates with rectilinear surfaces. Each of the teeth 64 has a leading edge parallel to the electric vector of energy in the annular waveguide 52.

The dominant mode of propagation in the rectangular waveguides 16 and 24 and the annular waveguide 52 is the $TE_{1,0}$ mode, which is characterized by having only transverse currents on the opposing E-plane walls. Electromagnetic energy of the $TE_{1,0}$ mode entering the rotary switch 10 through the rotary waveguide 24 will be propagated along the waveguide 24 and through the aperture 62 into the annular waveguide 52. When the energy enters the annular waveguide 52, the transverse currents will flow along the leading edges of the teeth 64, since these edges are parallel to the electric vector of the $TE_{1,0}$ mode. The surface defined by the leading edges of the teeth will, therefore, simulate an E-plane wall and the energy will be directed along the annular waveguide 52 in a clockwise direction, for example. A choke slot 66 may be arranged parallel to the wall 54 in a free edge of one or more of the teeth 64 to improve the electrical connection. Various equivalent arrangements of the teeth 64 may be employed if desired. The electromagnetic energy will be propagated along the annular waveguide 52 until it reaches another plurality of spaced teeth 64. The energy will then be directed through the nearby aperture 58 and along the waveguide 16 communicating with that aperture.

Figure 6:
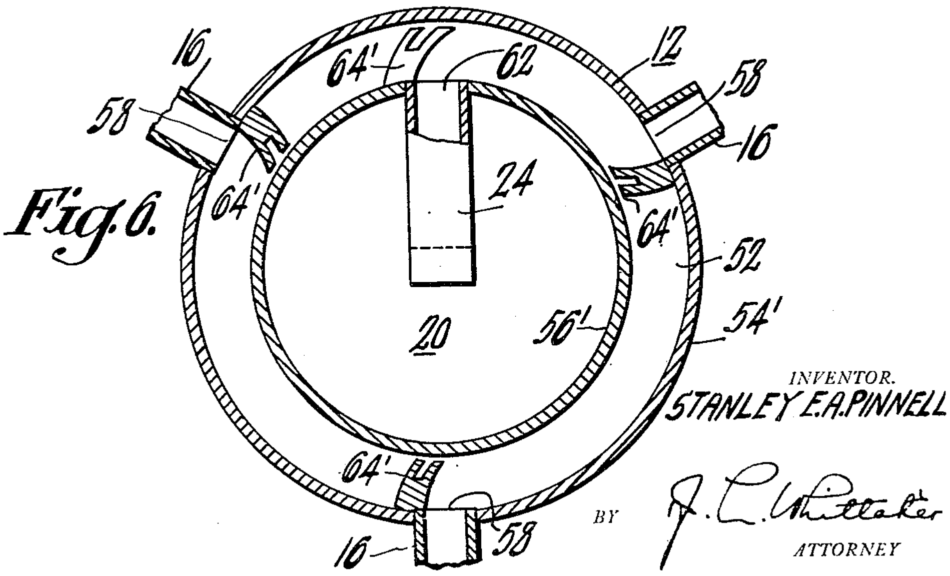
Figure 6 is a transverse cross-sectional view of another rotary switch which may be used with the invention.

If desired, the annular waveguide 52 may be a rectangular waveguide curved in the H-plane and the waveguides 16 and 24 may have their H-plane walls joined at right angles to the respective H-plane walls of the annular waveguide 52. In such a modification, as illustrated in Figure 6 wherein walls 54' and 56' are the H-plane walls of the annular waveguide 52, it may be desirable to employ curved or angularly displaced teeth 64', instead of the rectilinear teeth 64. The curved or angularly displaced teeth 64' may be of the type used in the well-known Foster scanner, as shown in Yevick Patent No. 2,446,863, and in Gordy Patent No. 2,521,844. The use of the rectilinear teeth 64 in the annular waveguide 52 of Figure 4 is preferred, however, because the leading edges of the rectilinear teeth 64 are parallel to the electric vector of the energy to be reflected, and therefore provide more efficient reflection.

Thus, the invention provides an improved microwave scanning system, such as a radar scanning system, which is useful for both continuous scanning and for sector scanning. The invention selectively provides a variety of modes of operation, including the following: (1) radiating or receiving a directional beam in a selected direction, (2) narrow-angle or sector scanning, (3) wide-angle or search scanning, (4) high-speed sector scanning with the sector slowly shifting through a larger search angle, (5) scanning of a plurality of sectors with each sector shifting through a larger search angle, and (6) radiating or receiving electromagnetic energy in each of a plurality of directions in turn.

What is claimed is:

1. A microwave scanning system comprising, a rotatable scanning member, a plurality of antenna elements rotatable with said scanning member and spaced about said scanning member in angular relation to each other; a feed member independently rotatable with respect to said scanning member, and energy switching means effective selectively and successively to couple said feed member to each of said antenna elements upon relative rotation of said feed member and said scanning member.

2. A microwave scanning system comprising, a rotatable scanning member, a plurality of antenna elements rotatable with said scanning member and spaced about said scanning member in angular relation to each other; a waveguide independently rotatable with respect to said scanning member, and energy switching means effective selectively and successively to couple said waveguide to each of said antenna elements upon relative rotation of said waveguide and said member.

3. The scanning system as set forth in claim 2, wherein said antenna elements extend radially outward from said scanning member in angularly spaced relation to each other.

4. A microwave scanning system comprising, a rotatable scanning member, a plurality of scanning waveguides extending radially outward from said scanning member in angularly spaced relation to each other, a rotating joint, a stationary waveguide extending from said rotating joint, a waveguide connected at one end to said rotating joint and independently rotatable with respect to said scanning member and said stationary waveguide, and energy switching means between said scanning member and an end of said rotatable waveguide remote from said rotating joint effective selectively and successively to transfer electromagnetic energy between said rotatable waveguide and each of said scanning waveguides upon relative rotation of said scanning member and said rotatable waveguide.

5. The scanning system as set forth in claim 4, wherein each of said scanning waveguides terminates in an antenna element at an end remote from said scanning member.

6. The scanning system as set forth in claim 4, wherein a horn antenna communicates with each of said scanning waveguides at an end remote from said scanning member.

7. The scanning system as set forth in claim 4, wherein an electromagnetic energy focusing device communicates with each of said scanning waveguides at an end remote from said scanning member.

8. The scanning system as set forth in claim 7 wherein said focusing device is a dielectric lens.

9. A microwave scanning system comprising, a rotatable scanning member, a plurality of antenna elements rotatable with said scanning member and spaced about said scanning member in angular relation to each other, a waveguide independently rotatable with respect to said scanning member, an annular waveguide formed between said rotatable scanning member and said waveguide, and energy switching means within said annular waveguide effective selectively and successively to couple said rotatable waveguide to each of said antenna elements upon relative rotation of said scanning member and said rotatable waveguide.

10. The scanning system as set forth in claim 9, wherein said energy switching means includes a plurality of spaced metal teeth within said annular waveguide.

11. The scanning system as set forth in claim 9, wherein said rotatable waveguide and said annular waveguides are hollow pipe waveguides.

12. A microwave scanning system comprising, a rotary switch, said rotary switch comprising a scanning member and a central member independently rotatable with respect to each other, a plurality of antenna elements rotatable with said scanning member and spaced about said scanning member in angular relation to each other, each of said independently rotatable members having a curved wall opposing a substantially parallel curved wall of the other of said members, an annular waveguide formed between said opposing curved walls, a rotating joint, a connecting waveguide rotatable with said central member of said rotary switch, one end of said connecting waveguide communicating with said annular waveguide in said rotary switch and the other end communicating with said rotating joint, a stationary waveguide extending from said rotating joint and adapted to be connected at an end remote from said rotating joint to a microwave transmitter or receiver, energy directing means within said annular waveguide in said rotary switch effective selectively and successively to transfer electromagnetic energy between said connecting waveguide and each of said antenna elements upon rotation of one of said members of said rotary switch with respect to the other.

13. An electromagnetic energy scanning system comprising, a plurality of antenna elements rotatable together about a common axis and spaced about said axis in fixed angular relation to each other, a waveguide rotatable independently of said elements, and energy switching means effective selectively and successively to couple said waveguide to each of said antenna elements upon relative rotation of said waveguide and said antenna elements.

14. In a wave radiating and receiving system, in combination, a plurality of directive transducer elements for directionally radiating or receiving wave energy; wave transmission means including coupling means adapted to be coupled to one of said transducer elements at a time, for coupling wave energy to or from said transducer elements; a fixed support; drive means, fixed with respect to said support, for independently driving said directive elements relative to said wave transmission means to electrically couple said wave transmission means to successive ones of said driven elements, when said wave transmission means is stationary; and drive means, fixed with respect to said support, for independently driving said wave transmission means relative to said directive transducer elements to electrically couple said driven wave transmission means to successive ones of said transducer elements, when the latter are stationary.

15. In a wave radiating and receiving system, in combination, a plurality of directive transducer elements fixed with respect to one another for directionally receiving and radiating wave energy, each said transducer element including means for coupling energy to and from that transducer; wave transmission means including coupling means adapted to couple energy to or from one of said transducer elements at a time; a fixed support; drive means fixed with respect to said support and operatively associated with said transducer elements for driving said elements relative to said wave transmission means to electrically couple successive ones of said driven elements to said transmission means, when the latter is stationary; and drive means fixed with respect to said support and operatively associated with said wave transmission means for driving said wave transmission means relative to said transducer elements to electrically couple said driven wave transmission means to successive ones of said transducer elements, when the latter are stationary.

16. In a wave radiating and receiving system as set forth in claim 15, means for maintaining said directive transducer elements stationary while driving said wave transmission means.

17. In a wave radiating and receiving system as set forth in claim 15, means for maintaining said wave transmission means stationary while driving said transducer elements.

18. In a wave radiating and receiving system as set forth in claim 15, means including both drive means for simultaneously driving both said transducer elements and said wave transmission means.

References Cited in the file of this patent

UNITED STATES PATENTS

| | | |
|---|---|---|
| 2,484,822 | Gould | Oct. 18, 1949 |
| 2,549,721 | Strauss et al. | Apr. 17, 1951 |
| 2,595,186 | Breetz | Apr. 29, 1952 |
| 2,601,610 | Hatch et al. | June 24, 1952 |